United States Patent
Chen et al.

(10) Patent No.: US 10,286,296 B2
(45) Date of Patent: May 14, 2019

(54) SMART PUZZLE CUBE HAVING PROMPTING AND RECORDING FUNCTIONS

(71) Applicant: Shanghai Dianhua Digital Technology Co., Ltd., Shanghai (CN)

(72) Inventors: Dejie Chen, Shanghai (CN); Peng Sun, Shanghai (CN)

(73) Assignee: SHANGHAI DIANHUA DIGITAL TECHNOLOGY CO., LTD., Shanghai (CN)

( * ) Notice: Subject to any disclaimer, the term of this patent is extended or adjusted under 35 U.S.C. 154(b) by 120 days.

(21) Appl. No.: 15/554,567

(22) PCT Filed: Apr. 25, 2016

(86) PCT No.: PCT/CN2016/080110
§ 371 (c)(1),
(2) Date: Aug. 30, 2017

(87) PCT Pub. No.: WO2016/173476
PCT Pub. Date: Nov. 3, 2016

(65) Prior Publication Data
US 2018/0161668 A1 Jun. 14, 2018

(30) Foreign Application Priority Data

Apr. 27, 2015 (CN) .......................... 2015 1 0200352
Jan. 30, 2016 (CN) .......................... 2016 1 0062930
Jan. 30, 2016 (CN) .......................... 2016 1 0062938

(51) Int. Cl.
*A63F 9/08* (2006.01)
*A63F 13/00* (2014.01)
*A63F 9/24* (2006.01)

(52) U.S. Cl.
CPC ............ *A63F 9/0842* (2013.01); *A63F 13/00* (2013.01); *A63F 2009/0846* (2013.01);
(Continued)

(58) Field of Classification Search
None
See application file for complete search history.

(56) References Cited

U.S. PATENT DOCUMENTS

| 4,421,311 A | * | 12/1983 | Sebesteny | ............. A63F 9/0838 273/153 S |
| 7,547,019 B2 | * | 6/2009 | Chen | ..................... A63F 9/0826 273/153 S |
| 9,586,132 B2 | * | 3/2017 | Stolten | .................. A63F 9/0811 |
| 2006/0163810 A1 | * | 7/2006 | Wang | .................... A63F 9/0842 273/153 S |

(Continued)

FOREIGN PATENT DOCUMENTS

| CN | 102068814 A | 5/2011 |
| CN | 102728052 A | 10/2012 |

(Continued)

*Primary Examiner* — Tramar Y Harper
(74) *Attorney, Agent, or Firm* — SZDC Law P.C.

(57) ABSTRACT

A smart puzzle cube having prompting and recording functions includes at least four cubes (101), a central sphere body (4), and at least one conductive connector (8). The cubes (101) and the central sphere body (4) are securely connected by the conductive connector (8) via a mechanical connection, the cubes (101) are structurally connected to each other and rotatable, and puzzle cube layers formed by the cubes (101) rotate in both directions without limit. The conductive connector (8) includes a rotation detection module (10) that detects rotation directions and angles of the puzzle cube layers.

20 Claims, 16 Drawing Sheets

(52) U.S. Cl.
CPC . *A63F 2009/245* (2013.01); *A63F 2009/2442* (2013.01); *A63F 2009/2488* (2013.01); *A63F 2300/1043* (2013.01); *A63F 2300/204* (2013.01)

(56) References Cited

U.S. PATENT DOCUMENTS

| | | | | |
|---|---|---|---|---|
| 2007/0262522 | A1* | 11/2007 | Lu | A63F 9/0842 |
| | | | | 273/153 S |
| 2008/0070657 | A1* | 3/2008 | Kratz | A63F 9/24 |
| | | | | 463/9 |
| 2008/0237981 | A1 | 10/2008 | Gilles et al. | |
| 2009/0305760 | A1* | 12/2009 | Shimizu | A63F 9/0834 |
| | | | | 463/9 |
| 2012/0184341 | A1* | 7/2012 | Dai | A63F 9/0842 |
| | | | | 463/9 |
| 2012/0302303 | A1* | 11/2012 | Rosendo | A63F 9/0842 |
| | | | | 463/9 |
| 2015/0076766 | A1* | 3/2015 | Liu | A63F 9/0826 |
| | | | | 273/153 S |

FOREIGN PATENT DOCUMENTS

| | | | | |
|---|---|---|---|---|
| CN | 203634799 U | 6/2014 | | |
| CN | 104874176 A | 9/2015 | | |
| CN | 204637531 U | 9/2015 | | |
| GB | 2489619 A | * 10/2012 | ........... | A63F 9/0842 |
| KR | 20080083569 A | * 9/2008 | ........... | A63F 9/0842 |
| WO | WO-2008046126 A1 | * 4/2008 | ........... | A63F 9/0842 |
| WO | WO-2018138586 A2 | * 8/2018 | ........... | A63F 9/0842 |

\* cited by examiner

101   Cube surface being detected

SMART PUZZLE CUBE HAVING PROMPTING AND RECORDING FUNCTIONS

The present invention is a National Phase Application of PCT/CN2016/080110, filed on Apr. 25, 2016, which claims priority to Chinese Patent Applications Nos. 201510200352.6, filed on Apr. 27, 2015, 201610062938.5, filed on Jan. 30, 2016, and 201600062930.9, filed on Jan. 30, 2016.

BACKGROUND OF THE INVENTION

Field of the Invention

The present invention relates to a smart toy field that has movable parts with respect to each other, more particularly to a smart puzzle cube having prompting and recording functions.

Discussion of the Related Art

Puzzle cube is a simple-structure, full-of-changes, popular intellectual toy. Since the invention of the puzzle cube in 1978, at least 1.8 billion puzzle cubes have been made world wide, and its popularity is the first among all intellectual toys. But the traditional puzzle cube has the following shortcomings: 1. difficulties to solve the puzzle cube, to know the formula for solving the puzzle cube, and to forget the formula; 2. difficulties to measure the time of solving the puzzle cube, measuring errors in puzzle cube competition being about 0.5 second; 3. difficulties to show the process of solving the puzzle cube and to record the process.

Chinese Application No. 201310180879.8 discloses an electronic third-order cube game system that uses photo-electric sensor, gravity magnetic force sensor and CPLD module technology, but it does not solve the problems with internal space, power supply, and no promoting function. Production cost is high, affecting mass production and application.

PCT Application Publication WO 0115059 A3 (Mar. 1, 2001) discloses an intellectual toy that is controlled by internal led lights and is different from traditional puzzle. But it cannot detect the position and rotation angle of each block of the puzzle cube, or record the cube operation process. Each cube requires its own battery and chip, so production cost is high, affecting mass production and application.

There are several basic technical problems to be solved to improve the traditional puzzle cube: 1. the parts the cube are movable, and the internal circuits of the puzzle cube may be broken at any time; 2. the rotation of the puzzle cube can in all directions without limitation; 3. internal electronic module and power supply management are limited by the internal space of the puzzle cube; and 4. control production while solving the above 3 problems. The present invention maintains the inherent characteristics of the traditional puzzle cube, fixed colors, unlimited rotation in all directions and at all levels. Further, it comes with prompting and recording functions, timing accuracy, multi-user communication, easy to use, and low cost. Dreams come true for puzzle cube players. The present invention solves the above technical difficulties and successfully introduces the present technical solution.

SUMMARY OF THE INVENTION

The present invention provides a smart puzzle cube having prompting and recording functions that includes at least four cubes, a central sphere body, and at least one conductive connector. The cubes and the central sphere body are securely connected by the conductive connector via a mechanical connection, the cubes are structurally connected to each other and rotatable, and puzzle cube layers formed by the cubes rotate in both directions without limit. The conductive connector includes a rotation detection module that detects rotation directions and angles of the puzzle cube layers.

The smart puzzle cube further includes: at least one cube detection module between each cube and the central sphere body, detecting the position and rotation state of each cube.

The cube detection module applies a conductive material and a physical contact detection method, and includes a conductive metal or a conductive medium that is elastic and deforms when pressed. When two neighboring cubes or one cube and the central sphere body are aligned, the conductive metal or the conductive medium contacts each other and an electrical connection is established; when two neighboring cubes or one cube and the central sphere body are not aligned, the conductive metal or the conductive medium does not contact each other and the electrical connection is not established; and when the electrical connection is established, the central sphere body detects a voltage and a current of the electrical connection in each cube, and calculates the position and rotation state of each cube. The cube detection module includes a conductive sponge, a metal plated silicone ball, a metal dome swipe, a conductive plush pad, a conductive brush, a spring contact probe, or a metal dome.

The conductive sponge includes a sponge that is elastic and deforms when pressed and an outer wrapping conductive cloth; the metal plated silicone ball includes a ball that is elastic and deforms when pressed and an outer conductive metal layer; the cube detection module applies a non-physical-contact wireless detection method and includes a photoelectric detection module; and the photoelectric detection module is located on a surface of the central sphere body, emits a light to a corresponding part to each cube, detects a color and signature of a reflected light, and calculates the position and rotation state of each cube. The light is an infrared light or laser.

The smart puzzle cube further includes: cube housings, a central sphere body housing, a prompting module, a gyroscope module, a wireless receiving-emitting device, a power supply module, a switch, and a control module.

The smart puzzle cube is a multi-faceted three-dimensional body and includes at least eight cubes combined into an n-th order hexagonal cube of n×n×n, n is an integer equal to or greater than 2, the cubes being divided into eight corner blocks, 12(n−2) side blocks and 6(n−2) center blocks; the eight corner blocks are each located at eight vertex angles of the hexagonal cube; the 12(n−2) side blocks are each located at twelve sides of the hexagonal cube and between two corner blocks; the 6(n−2) center blocks are each located at six faces of the hexagonal cube and surrounded by the corner blocks and side blocks; and when n is an even number, the cubes are further divided into hidden side blocks and center blocks. The central sphere body is a structural center of the smart puzzle cube and has a sphere or a similar shape, and is combinable with some cubes.

The cube housings are made of a translucent material or a partially hollow material, and a light from an electric bead can pass through.

The conductive connector includes a conductive stud, a spring, and a nut; the rotation detection module includes a conductive brush and a non-full-ring resistor, the center block rotating and driving the non-full-ring resistor, the conductive brush being non-rotatable, forming a ring-shaped detection circuit; the conductive stud includes a conductive stud housing, a plurality of metal bodies surrounding an axis and segmented conductors, realizing an electrical connection of an uniaxial rotation of conductors; and the spring is located inside of the central sphere body or inside the center block.

The rotation detection module includes a rotary potentiometer or an encoder.

The gyroscope module includes a gyroscope and an accelerometer, calculating overall flip data.

The wireless receiving-emitting device is connected to an external computer, a virtual program of the external computer being synchronized with smart puzzle cube; the virtual program of the external computer calculates a reduction formula and records the operation of the smart puzzle cube; and the external computer is connected to interne, and the external computer is a mobile phone or a mobile computer.

The prompting module applies a prompting method via an electric bead, the an electric bead is located inside of each cube or on a surface of each cube corresponding to the central sphere body and is controlled by a program, and the electric bead flashes based on a certain rule to provide prompts.

The prompting module applies a voice mode or other sensory mode.

The power supply module includes a rechargeable battery located inside the central sphere body, the switch is located inside or on a surface of the center block, and the switch is connected to the control module that is located inside the central sphere body via the conductive connector.

The smart puzzle cube further includes: a wireless charging base. The wireless charging base includes a power management module and wireless transmitter module, a puzzle cube is placed on the wireless charging base, the central sphere body or the cube includes a wireless charging receiver module.

The smart puzzle cube further includes a timer module. The timer module starts when detecting a operation signal; and the timer stops when detecting the colors on all sides of the smart puzzle cube match.

Figure 1:
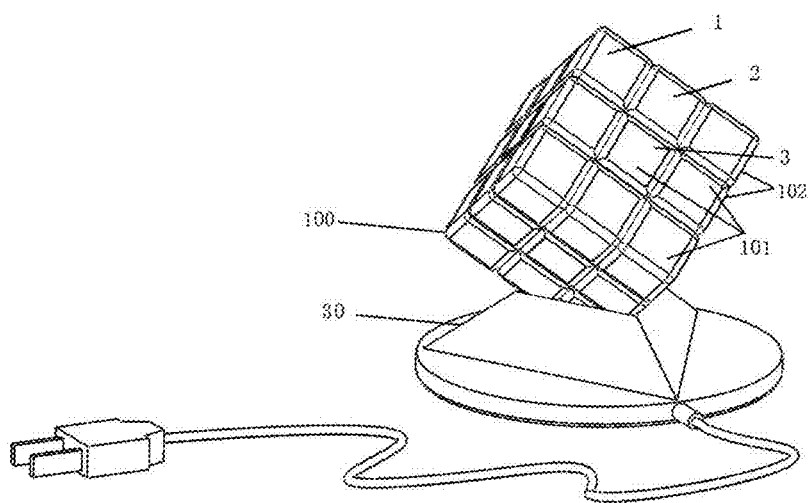
FIG. 1 shows a 3×3×3 puzzle cube and a wireless charging base.

In the drawings, 100, puzzle cube; 101, cubes; 102, cube housings; 103, 2×2×2 puzzle cube; 104, 4×4×4 puzzle cube; 105, a pyramid tetrahedron puzzle cube; 106, a pentagonal dodecahedron puzzle cube; 107, 2×2×1 puzzle cube; 1, corner block; 2, side block; 3, side block; 4, central sphere body; 402, hole; 5, cube detection module; 6, spring; 7, nut; 701, washer; 8, conductive connector; 800, conductive stud; 9, physical detection module circuit; 10, rotation detection module; 12, conductive brush; 13, switch; 14, prompting module; 15, cover; 16, profile; 17, contacting point; 18, hole; 19, buckle; 20, slot; 24, electric bead; 25, resistor; 26, control module; 27, gyroscope module; 28, power supply module; 29, wireless transmitter module; 30, base; 31, power management module; 32, external power; 33, wireless charging receiver module; 34, external computer; 35, internet; 36, wireless receiving-emitting module; 37 photoelectric detection module; 38, modulation power supply; 39, light source; 40, light lens; 41, optical lens; 42, photoelectric receiving module; 43, detection amplifier module; 44, filter amplification module; 45, setting module; 46, comparison and magnification module; 47, light; 48, radio electromagnetic waves; 49, radio communication signals; 50, conductive base surface; 51, conductive cloth; 52, sponge; 53, gold-plated metal layer; 54, rubber spheres; 55, metal flakes; 56, conductive plush; 57, conductive brush; 58, metal cylinder housing; 59, spring; 60, metal dome; 61, partial center; 62, projection point; 63, projection point; 64, projection point; 65, projection point; 66, projection point; 67, projection point; 68, projection point; 69, projection point; 70, projection point; 71, projection point; 72, partial center; 75, contact point; 76, gyroscope; 77, accelerometer; 81, conducting housing; 83, conductive metal; 84, conductive metal; 85, conductive metal; 86, conductive metal; 87, conductive metal; 88, conductive metal; 89, conductive metal; 90, conductive metal; 91, conductive metal; 92, conductive metal; 93, conductive metal; 94, conductive metal; 95, conductive metal; 96, axis; 97, non-full-ring resistor.

DETAILED DESCRIPTION OF THE ILLUSTRATED EMBODIMENTS

Embodiment 1: a 3×3×3 Puzzle Cube (100) that Applies a Physical Contact Detection Method FIG. 1 shows that a 3×3×3 puzzle cube is placed on a wireless charging base (30). The puzzle cube (100) includes 26 cubes (101), 8 corner blocks (1), 12 side blocks (2), 6 center blocks (3); cube housing (102) is made of a translucent material or a partially hollow material, and a light from an electric bead (24) can pass through. The wireless charging base (30) has a triangular shape. The puzzle cube placed on the base is not only aesthetically pleasing, but also practical with wireless charging function.

Figure 2:
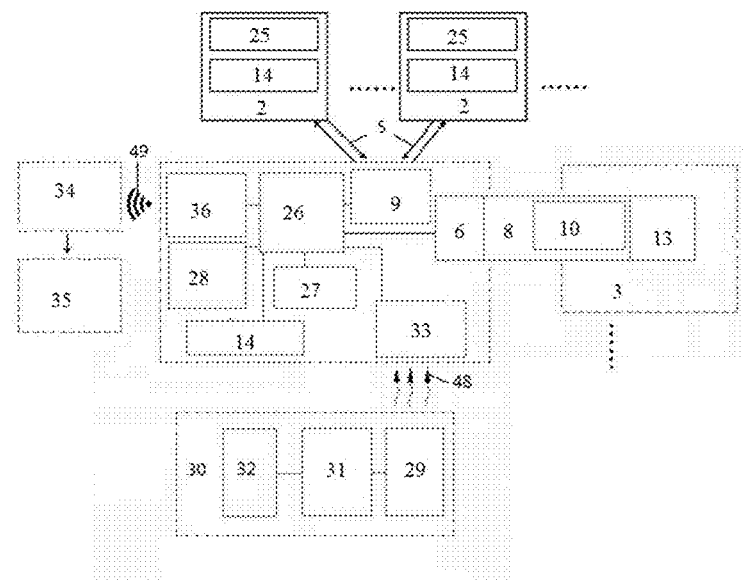
FIG. 2 shows a physical contact detection method of cubes.

FIG. 2 is a schematic block diagram of the present embodiment. The inside of the corner block (1) and side block (2) includes identification resistor (25) and prompting module (14), and an electrical path can be connected via cube detection module (5) and central sphere body (4); conductive connector (8) connects center block (3) and the central sphere body (4). Spring (6) of the conductive connector (8) is located inside the sphere body. Rotation detection module (10) is located inside the center block (3), and connects with touch switch (13) of the center block (3). The central sphere body (4) includes control module (26), gyroscope module (27), cube detection module (5) with physical contact detection module circuit (9), power supply module (28), prompting module (14), and wireless receiving-emitting module (36). The wireless receiving-emitting module (36) communicates with external computer (34) or mobile phone radio communication signal (49). The external computer (34) or the mobile phone is further connected to internet (35) network platform. The base (30) is connected to external power source (32), through power management module (31), and wireless transmitter module (29) emits radio wave (48) to wireless charging receiver module (33) in the central sphere body (4) for wireless charging.

Figure 3:
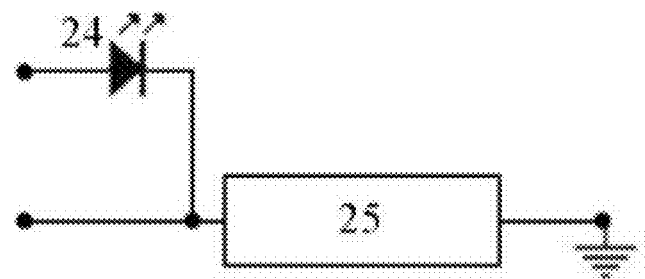
FIG. 3 is a circuit diagram showing the physical contact detection method of cubes.

FIG. 3 is a circuit diagram of cubes (101). The resistance of each identification resistor (25) is different. The prompting module (14) includes a luminous bead (24).

Figure 4:
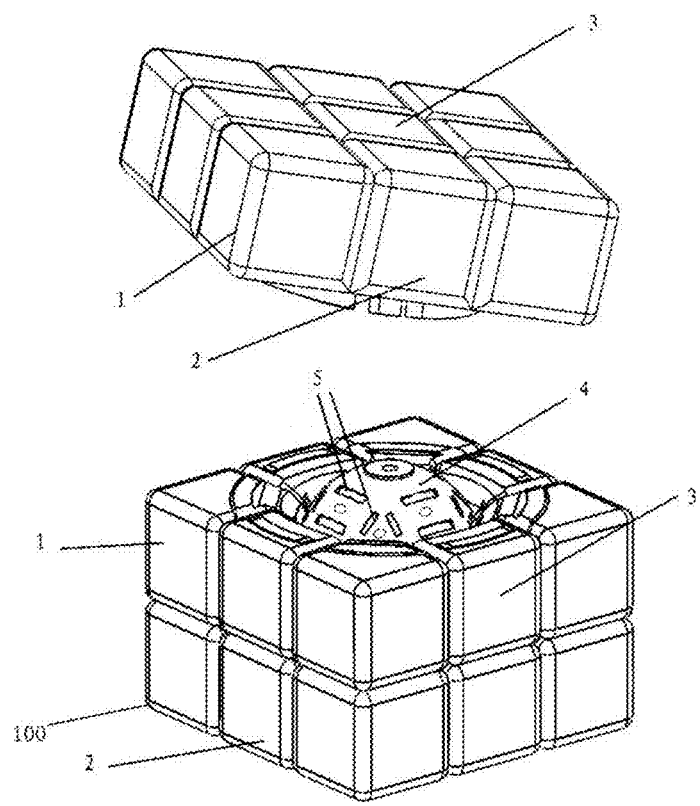
FIG. 4 shows a 3×3×3 puzzle cube with a central sphere body inside.
Figure 23:
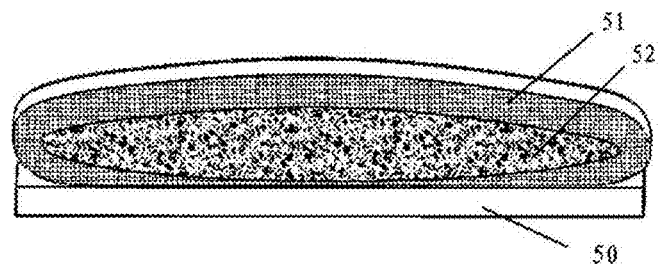
FIG. 23 shows the structure of a conductive sponge.

FIG. 4 shows that the center of the puzzle cube (100) is central sphere body (4). The central sphere body (4) may be a spherical shape or other similar shape. The sphere body is made of a nonconductive material and on its surface, includes cube detection module (5), corresponding to each cube (101). The cube detection module (5) may use a conductive sponge. FIG. 23 shows the structure of the conductive sponge. The conductive sponge includes sponge (52) that is elastic and deforms when pressed and an outer wrapping conductive cloth (51). The outer wrapping conductive cloth (51) is electrically connected with conductive base surface (50). When two neighboring cubes (101) or one cube (101) and the central sphere body (4) are aligned, the cube detection modules (5) are in contact with each other, an electrical connection is established and electrical signal transmission is achieved. The unique feature of each cube (101), i.e., the value of current or voltage, is detected, and the position and the rotation state of each cube (101) can then be calculated.

Figure 5:
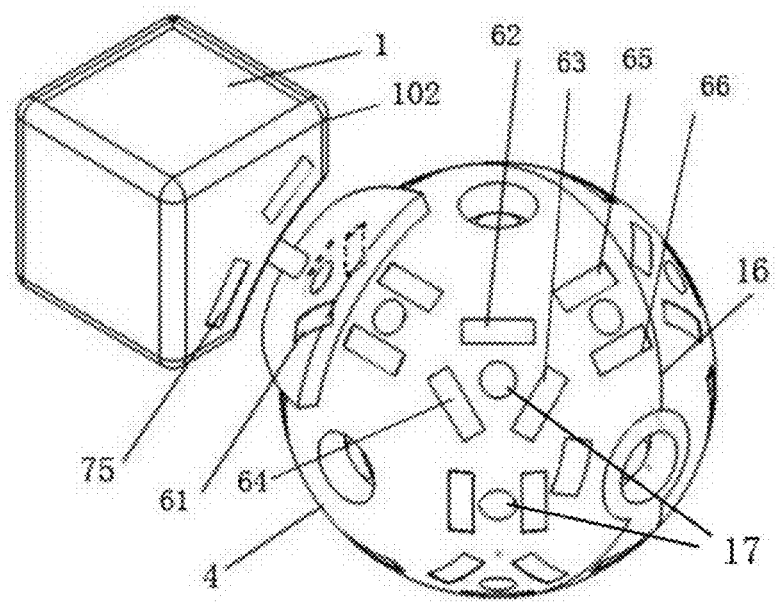
FIG. 5 shows a cube detection module and its location.

FIG. 5 shows the structure of cube detection module (5). Corner block (1) has a partial center detection point (61) that corresponds to sphere body. The partial center detection point (61) has 3 corresponding projection points (62, 63, 64) on the central sphere body (4), regardless the rotation state of the corner block (1). When the puzzle cube is aligned, the partial center detection point (61) must form an electric connection with 3 projection points. Similarly, projection points (65, 66) correspond to side block (2). When the puzzle cube is aligned, conductive medium contact points (75) on the surface of cubes (101) can be in contact with each other to form electric connection; prompting module (14) is placed at contact point (17).

Figure 6:
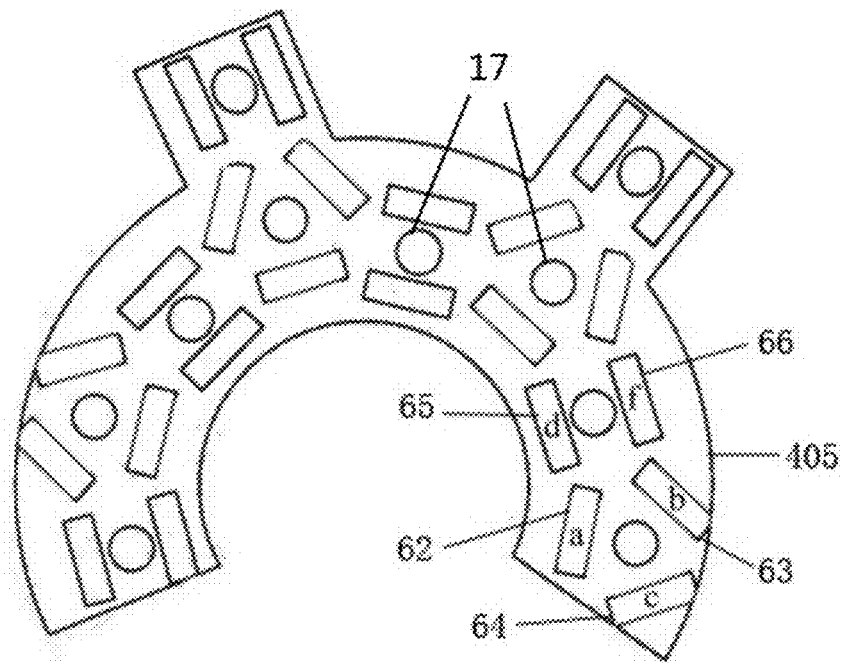
FIG. 6 is an expended view of a physical contact detection module on a hemispherical surface.

FIG. 6 is a flat view of physical detection module circuit (9) on the surface of the central sphere body (4), and shows projection points (62, 63, 64) that correspond to corner block (1), projection points (65, 66) that correspond to side block, and contacting point (17) that corresponds to prompting module (14).

Figure 22:
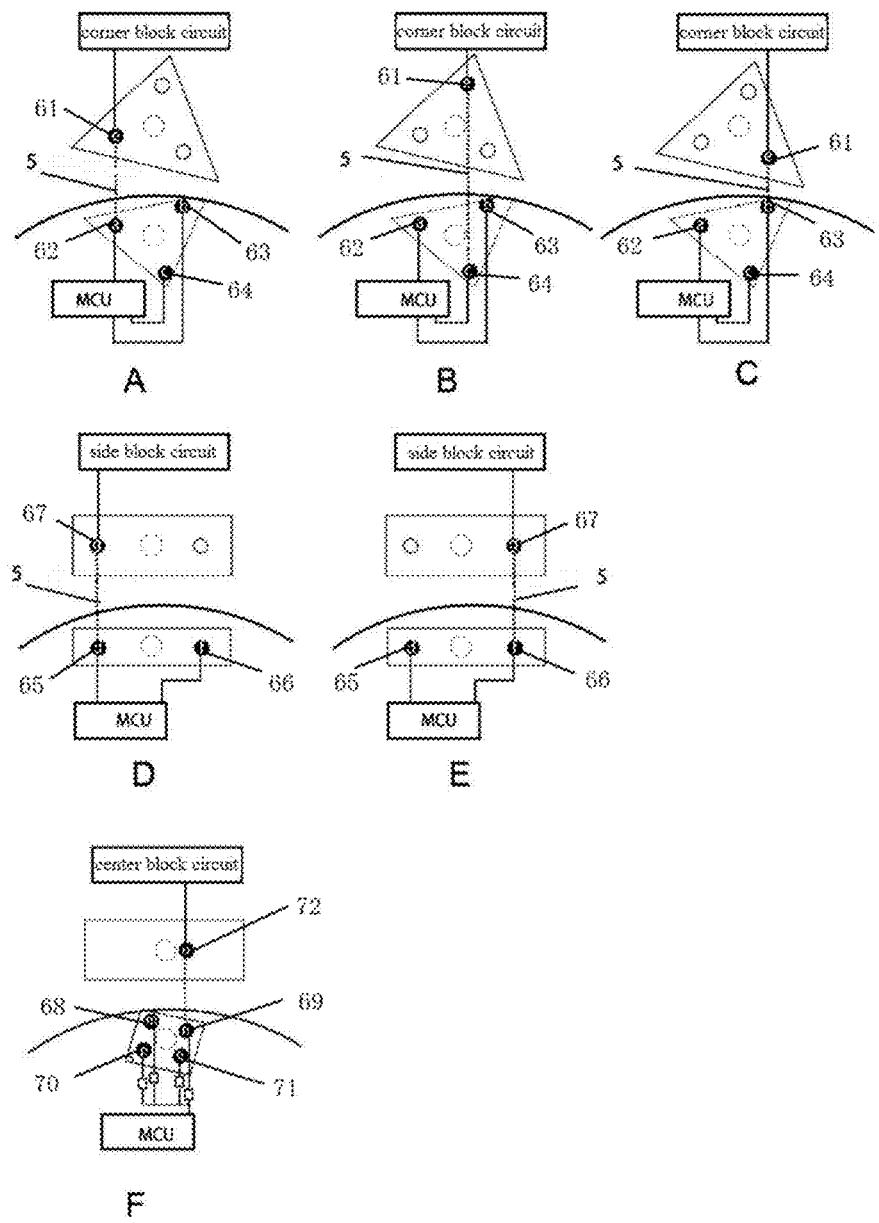
FIG. 22 shows a cannel cube detection module among the corner block, the side block, center block, and the central sphere body.

FIG. 22 is a schematic diagram of a channel detection module used between corner blocks, side blocks, center blocks, and the central sphere body. One channel can detect the position and rotation state of corner blocks, side blocks, center blocks, so the number of cube detection module can be reduced to a minimum. The method includes: I. detecting corner blocks (1): corner blocks (1) have three colored faces representing three different states. The three different states can be detected with a channel detection medium: corner block (1) includes partial center point (61), corresponding to projection points (62, 63, 64) on the central sphere body (4). At least one projection point aligns with the partial center point (61), forming two points connection detection medium (5) position. Detecting the unique detection characteristic of one corner block (1) will reveal the position of this corner block in 8 possible positions. The rotation state of the corner block (1) can also be calculated by the uniqueness of the angle (see FIG. 22A, B, C). II: detecting side block (2): side blocks (2) have two colored surfaces representing two different states. The two different states can be detected with a channel detection medium: side block (2) includes partial center point (67), corresponding to projection points (65, 66) on the central sphere body (4). At least one projection point aligns with the partial center point (67), forming two points connection detection medium (5) position. Detecting the unique detection characteristic of one side block (2) will reveal the position of this corner block in 12(n−2) possible positions. The rotation state of the side block (2) can also be calculated by the uniqueness of the angle (see FIGS. 22D, E). III. detecting center block (3): center blocks (1) have one colored surface representing one state. This state can be detected with a channel detection medium: center block (3) includes partial center point (72), corresponding to 4 projection points (68, 69, 70, 71) on the central sphere body (4). At least one projection point aligns with the partial center point (72), forming two points connection detection medium (5) position. Detecting the unique detection characteristic of one center block (3) will reveal the position of this corner block in $6(n-2)^2$ possible positions. The rotation state of the center block (3) can also be calculated by the uniqueness of the angle (see FIG. 22F).

Figure 7:
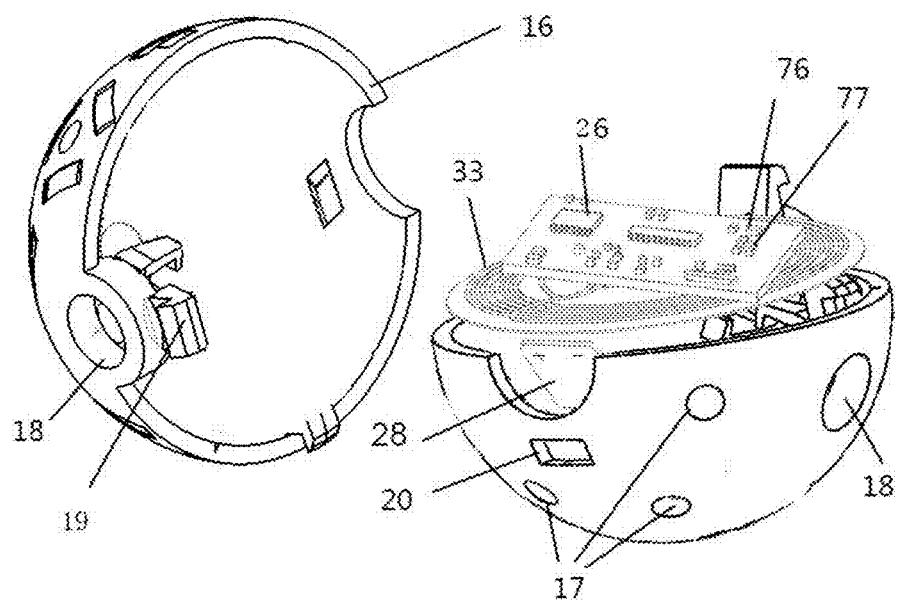
FIG. 7 shows the inside structure of a central sphere body of a puzzle cube.

FIG. 7 shows that the central sphere body (4) is divided into two hemispheres along profile (16). The hemispheres are connected by buckle (19) and slot (20). Inside the central sphere body (4) are control module (26), gyroscope (76), accelerometer (77), power supply module (28), wireless charging receiver module (33), wireless receiving-emitting module (36), and prompting module (14).

Figure 8:
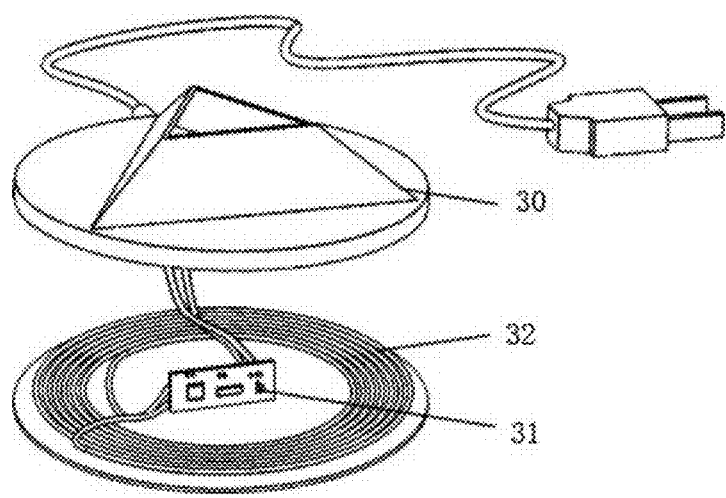
FIG. 8 shows the structure of a wireless charging base.

FIG. 8 shows the structure of the wireless charging base (30). External power (32) wirelessly charges to center sphere body (4) via power management module (31) and wireless transmitter module (29).

Figure 9:
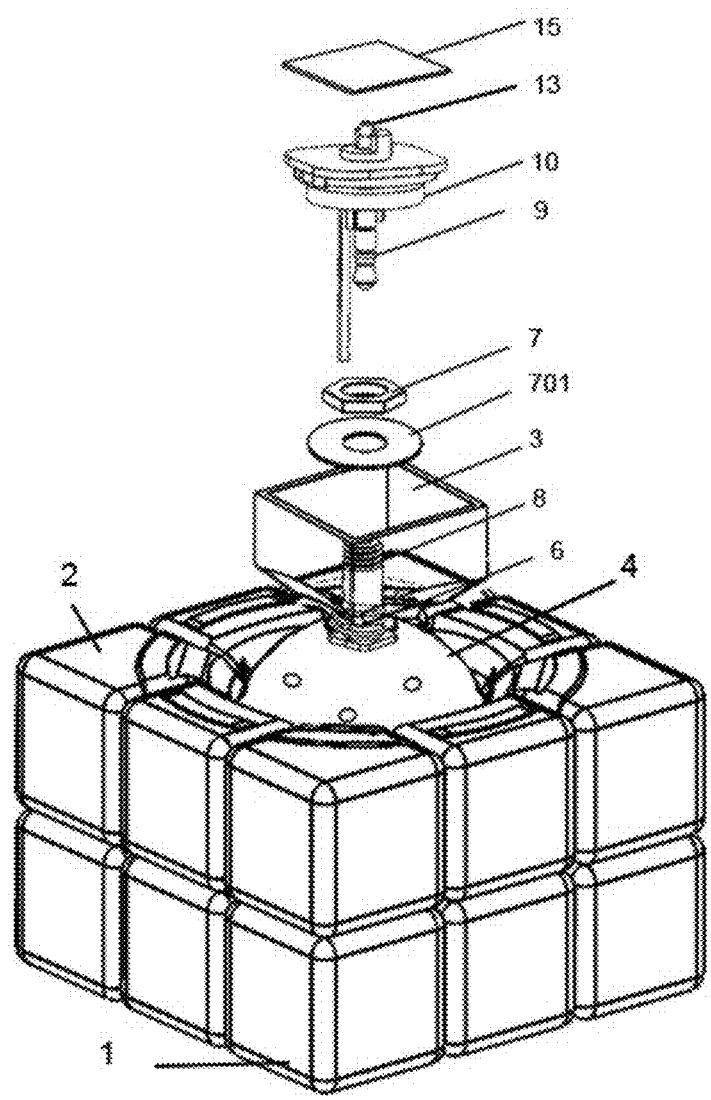
FIG. 9 shows the structural relationship of a central sphere body, a conductive connector, and center block.

FIG. 9 shows the relationship of conductive connector (8), central sphere body (4), and center block (3). The conductive connector (8) includes conductive stud (800) and rotation detection module (10). In this embodiment, there are 6 rotation detection modules, corresponding to 6 center blocks (3), passing through the central sphere body (4), spring (6), washer (701), connecting with center blocks (3), tightening by nut (7). Switch (1) and cover (15) of center block (3) are located at the top of the conductive connector (8). User can control the switch (13) by pressing the cover (15).

Figure 10:
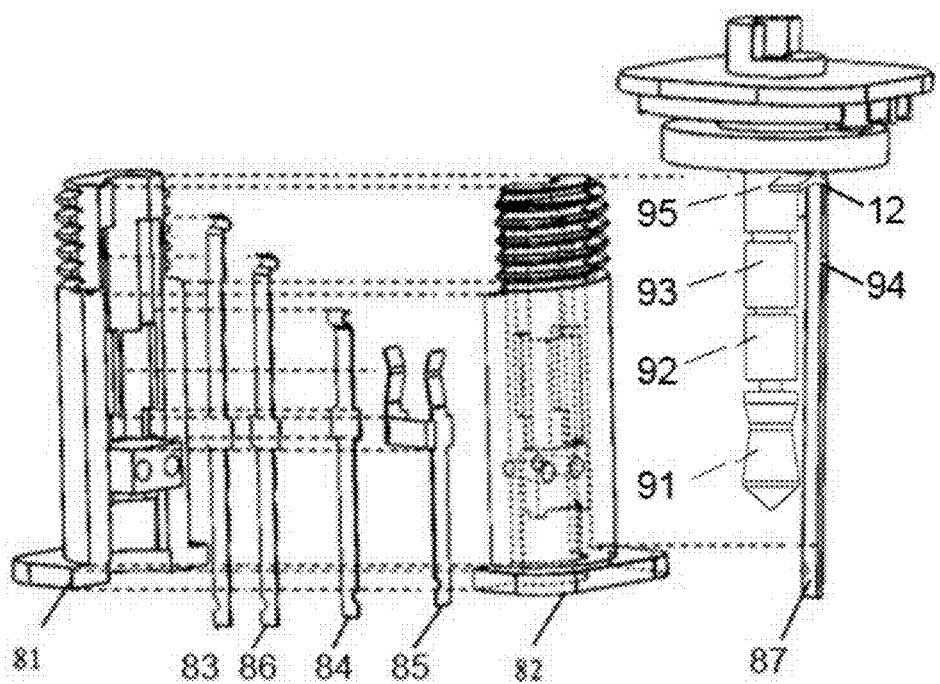
FIG. 10 shows the inside structure of a conductive stud.

FIG. 10 shows that conductive stud (800) includes two conducting housings (81) for strengthening and the metals (83, 84, 85, 86, 91, 92, 93, 94) for electrical connection.

Figure 11:
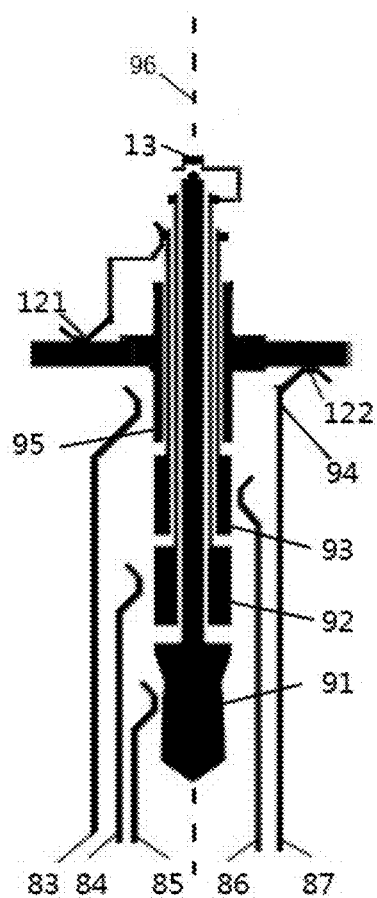
FIG. 11 shows a conductive connector's conductive circuit.

FIG. 11 shows a schematic diagram of the conductive metal circuits in the conductive stud (800). The conductive metals (83, 84, 85, 86, 87) are fixed; the conductive metals (92, 93, 95) have a ring type shape. The conductive metal (91) passes through axis (96). These conductive metals are related, but do not form electric connection, circling around axis (96). Conductive metal (83) corresponds to conductive metal (95); conductive metal (84) corresponds to conductive metal (92) and conductive brush (12); conductive metal (85) corresponds to conductive metal (91); conductive metal (86) corresponds to conductive metal (93); conductive metal (87) corresponds to conductive metal (94) and conductive brush (12), forming electric connection. Conductive metals (85, 91) and conductive metals (84, 92) form the circuit of the switch (13), respectively.

Figure 12:
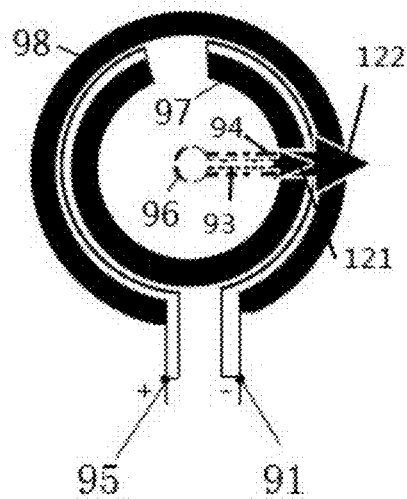
FIG. 12 shows a conductive connector and rotation angle detection.

FIG. 12 shows a circuit schematic of rotation detection module (10). Non-full-ring resistors (97) have a circular angle between 180° and 360°, and two non-full-ring resistors are dislocated with each other; two resistors share the positive and negative terminals of the conductive metals (91, 95); conductive brush (12) connects with the surface of the non-full-ring resistor (97). The conductive brush's (12) position relative to the central sphere body (4) remain constant, and the non-full-ring resistor's (97) position relative to center block (3) remains constant. When the center block (3) rotates around the central sphere body (4), the electric brush (12) can rotate around axis (96) and slides over different parts of the resistor (97). Two electric brushes (12) electrically connect with conductive metals (93, 94), respectively.

Figure 13:
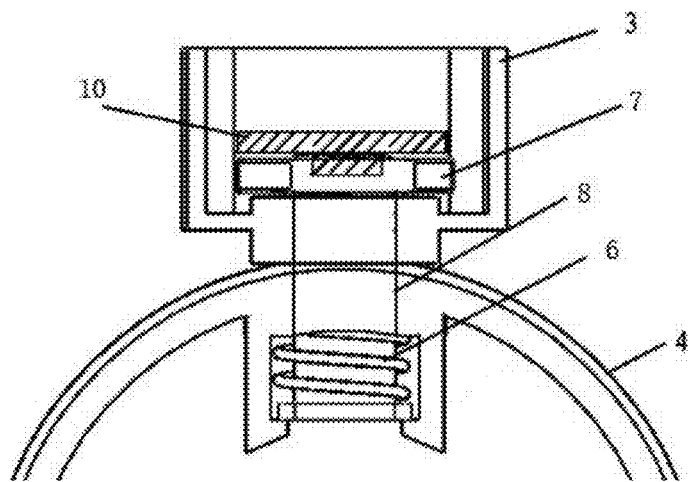
FIG. 13 shows the first embodiment of the structural relationship of a conductive stud and a spring, the spring being inside a ball.
Figure 14:
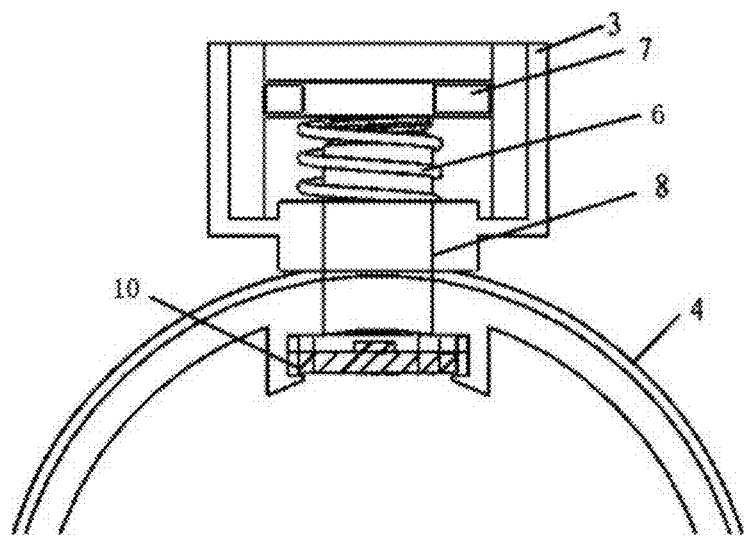
FIG. 14 shows the second embodiment of the structural relationship of a conductive stud and a spring, the spring being inside a center block.

FIG. 13 shows the position of spring (6). In this embodiment, spring (6) is located inside the central sphere body (4), and rotation detection module (10) is located inside center block (3). Alternatively, FIG. 14 shows that spring (6) is located inside the center block (3) and the rotation detection module (1) is located inside the central sphere body (4).

Figure 30:
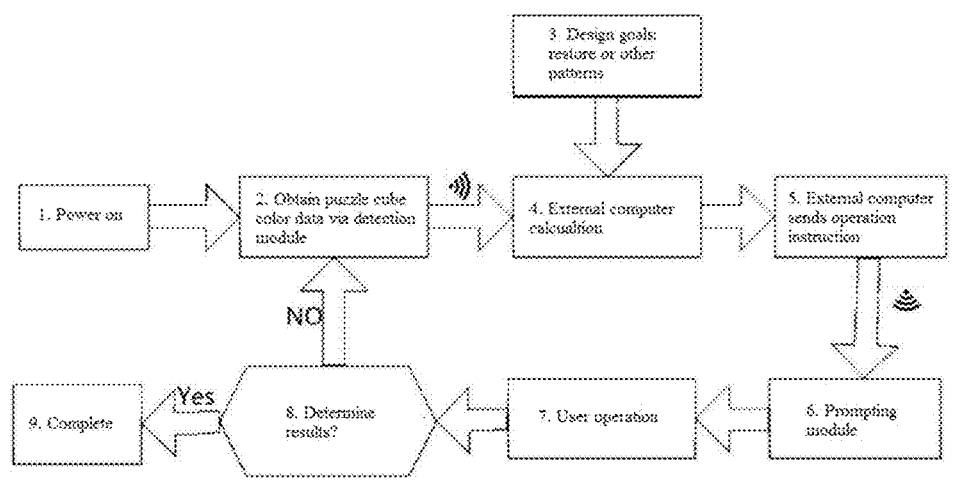
FIG. 30 is a puzzle cube operation flow chart.

FIG. 30 is a puzzle cube operation flow chart.

1. Cube detection module (5) acquires the position and rotation state of each cube (101) obtain an array of color data for the puzzle cube; wireless receiving-emitting module (36) transmits the data to external computer (34) or a mobile phone.

2. The external computer (34) or mobile phone creates a three-dimensional virtual display of the puzzle cube, calculates a set of restore operation step formula or a set of pattern instruction formula based on the data, and sends the formula to puzzle cube (100) wirelessly.

3. The puzzle cube (100) controls the on-off of electric beads (24) of the prompting module based on received formula. The electric beads (24) in the cubes (101) to be rotated flash in a certain direction to prompt a user to complete the next step.

4. When the user operates the puzzle cube (100), rotation detection module (10) detects the actual rotation direction and angle, and control module (16) determines whether the operation follows the formula. Wireless receiving-emitting module (36) transmits the actual rotation angle and whole flip data measured by gyroscope module (27) to the external computer (34) or mobile phone so that the three-dimensional virtual display of the puzzle cube and actual puzzle cube are identical.

5. If the operation is correct, the electric beads continue to flash in a certain direction, and so on so forth. When the user successfully follows all the directions, puzzle cube will return to its original position.

6. If the operation is incorrect, the user is directed to return to the previous state. After 3 incorrect operations, step 1 will be repeated, and restore formula will be re-calculated.

7. In step 4, when the program detects the first complete operation, timing starts. When the program detects colors on all the layers are the same, operation is automatically timed as complete.

The entire operation can be recorded through the control module or the external computer (34).

In this embodiment, timing module uses a software program. When the program detects the first complete operation, timing starts; when the program detects colors on all the layers are the same, operation is automatically timed as complete.

Figure 15:
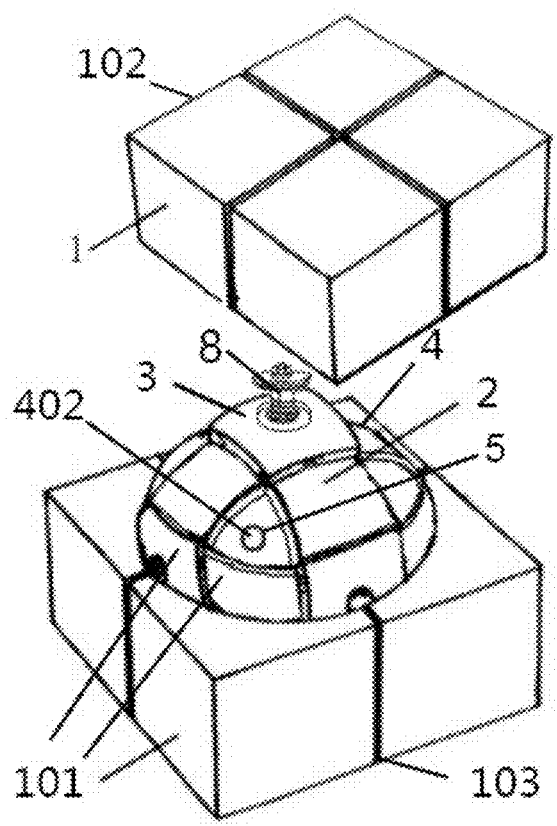
FIG. 15 shows a 2×2×2 puzzle cube with a central sphere body inside.

Embodiment 2: a 2×2×2 Puzzle Cube (103) that Applies a Non-Physical Contact Wireless Detection Method FIG. 15 shows a 2×2×2 puzzle cube, which includes 20 cubes (101). The cubes include 8 corner blocks (1) that are visible, 3 invisible center blocks (3) and 9 invisible side blocks (2). Central sphere body (4) is located inside and connects with a corner block (1). The central sphere body (4) includes 3 conductive connectors (8) connecting with 3 center blocks (3). Cubes (101) are structurally connected to each other and rotatable. The conductive connector (8) includes rotation detection module (10) that includes a photoelectric encoder that detects rotation direction and angle. Cube detection module (5) uses a photoelectric detection module, located inside hole (402) on a position on the sphere that corresponds to corresponding corner block (1). Cube housing (12) is made of a translucent material or a partially hollow material, and a light from an electric bead (24) can pass through.

Figure 16:
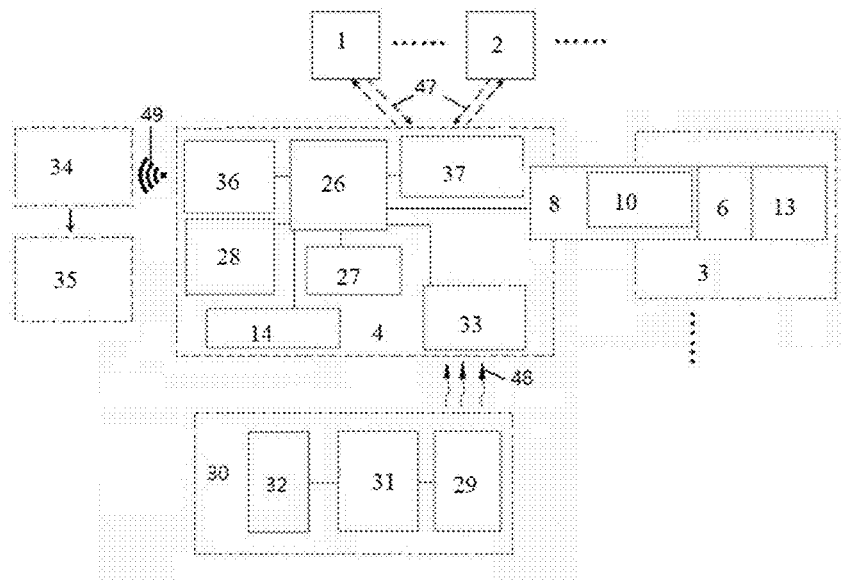
FIG. 16 shows a non-physical contact wireless detection method of cubes.

FIG. 16 is a schematic block diagram of the present embodiment. Cube (101) includes corner block (2), side block (2), corresponding surface on central sphere body (4) having unique code or color; center block (3) connects with spring (6) via conductive connector (8) to form electric connection. Conductive connector (8) includes rotation detection module (10), and connects with touch switch (13) inside center block (3); central sphere body (4) includes control module (26), gyroscope module (27), photoelectric detection module (37) of cube detection module (5), power supply module (28), prompting module (14), wireless receiving-emitting module (36). The wireless receiving-emitting module (36) communicates with external computer (34) or mobile phone radio communication signal (49). The external computer (34) or the mobile phone is further connected to internet (35) network platform. Photoelectric detection module (37), through hole (402), emits light (47) towards corner block (1), and receives reflected light (47). Prompting module emits light via hole (402). The base (30) is connected to external power source (32), through power management module (31), and wireless transmitter module (29) emits radio wave (48) to wireless charging receiver module (33) in the central sphere body (4) for wireless charging. Optical lens (41) adjusts the optimum effect to photoelectric receiving module (42), through detection amplifier module (43), filter amplification module (44), comparison and magnification module (46), to output identification signal to control module (26).

Other components of this embodiment are similar to those of embodiment 1.

Embodiment 3: a 2×2×1 Puzzle Cube (107)

Figure 17:
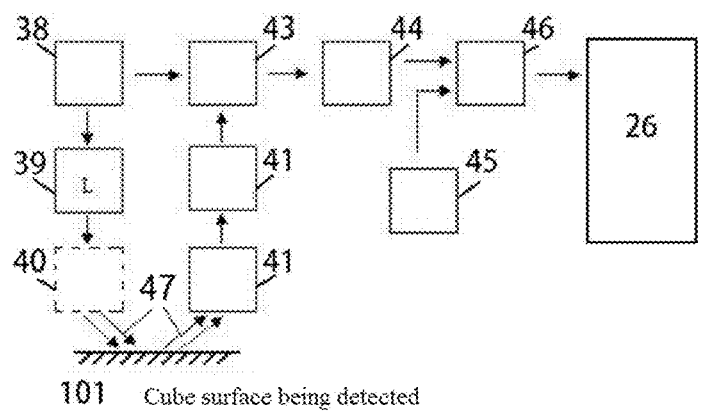
FIG. 17 shows a non-physical contact photoelectric detection method of cubes.

FIG. 17 shows the structure of a 2×2×1 puzzle cube that includes 4 cubes (101), 1 central sphere body (4). The central sphere body (4) is integrated with one cube, and control module (26), power supply (28) are located inside therein. Conductive connector (8) extending from the inside of central sphere body (4) is structurally connected to other 3 cubes, and all can rotate with respect to each other. Surface of the central sphere body corresponding to the cubes includes cube detection module (5). Other components of this embodiment are similar to those of embodiment 1.

Embodiment 4: a 4×4×4 Puzzle Cube (104)

Figure 18:
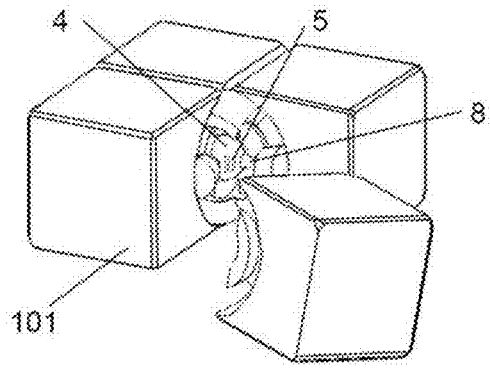
FIG. 18 shows a typical 2×2×1 puzzle cube.

FIG. 18 shows the structure of 4×4×4 puzzle cube that includes 8 corner blocks (1), 24 side blocks (2), and 24 center blocks (3). Other components of this embodiment are similar to those of embodiment 1.

Embodiment 5: a Pyramid Tetrahedron Puzzle Cube (105)

Figure 19:
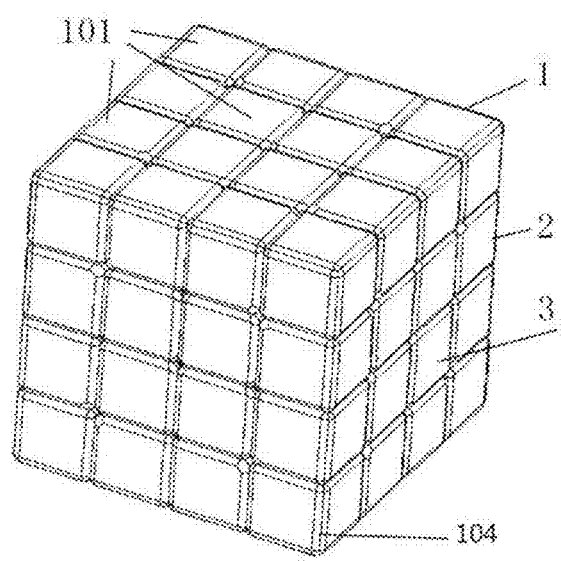
FIG. 19 shows a typical 4×4×4 puzzle cube.

FIG. 19 shows the structure of pyramid tetrahedron puzzle cube that includes 4 corner block (1), 6 side blocks (2), 12 center blocks (3). Other components of this embodiment are similar to those of embodiment 1.

Embodiment 6: a Pentagonal Dodecahedron Puzzle Cube (106)

Figure 20:
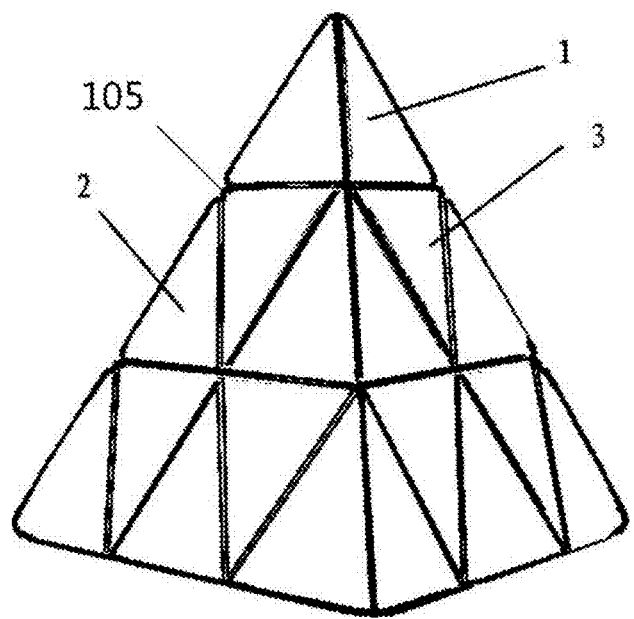
FIG. 20 shows a pyramid tetrahedron puzzle cube.
Figure 21:
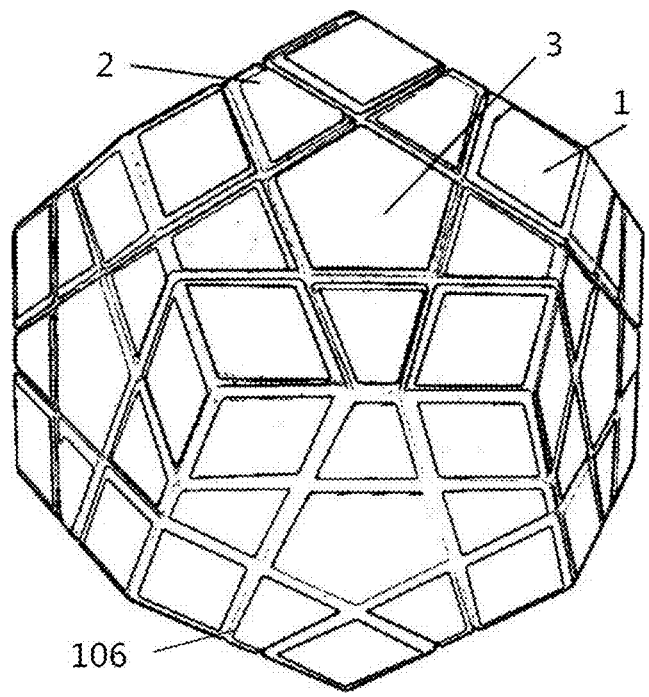
FIG. 21 shows a pentagonal dodecahedron puzzle cube.

FIG. 20 shows the structure of pentagonal dodecahedron puzzle cube that includes 12 corner blocks (1), 20 side blocks (2), 30 center blocks (3). Other components of this embodiment are similar to those of embodiment 1.

Figure 24:
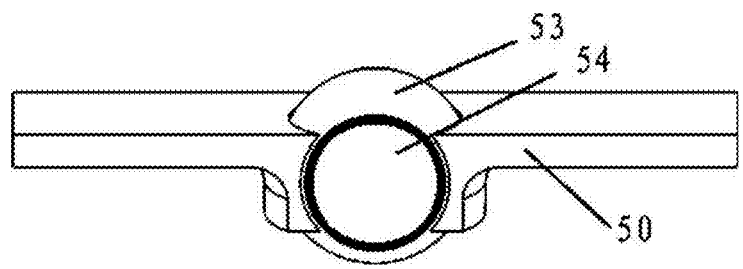
FIG. 24 shows the structure of a metal plated conductive ball.

Embodiment 7: Cube Detection Module (5) that Uses a Physical Contact Method: Metal Plated Silicone Ball FIG. 24 shows the structure of metal plated silicone ball that includes a ball (54) that is elastic and deforms when pressed and an outer conductive metal layer (53). The outer conductive metal layer (53) electrically connects with conductive base surface (50). Other components of this embodiment are similar to those of embodiment 1.

Figure 25:
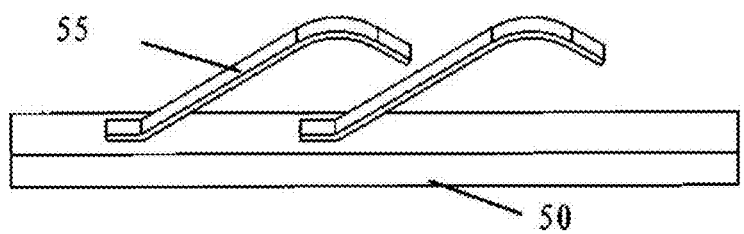
FIG. 25 shows the structure of a conductive metal dome.

Embodiment 8: Cube Detection Module (5) that Uses a Physical Contact Method: Metal Dome Swipe FIG. 25 shows the structure of metal dome swipe that includes a plurality of metal flakes (55) that are elastic and deforms
when pressed. The metal flakes (5) electrically connect with conductive base surface (50). Other components of this embodiment are similar to those of embodiment 1.

Figure 26:
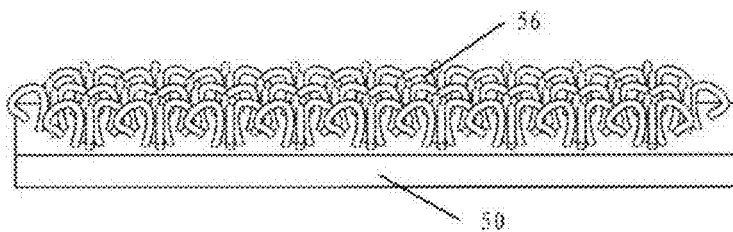
FIG. 26 shows the structure of a conductive plush pad.

Embodiment 9: Cube Detection Module (5) that Uses a Physical Contact Method: Conductive Plush FIG. 26 shows the structure of conductive plush (56) that is elastic and deforms when pressed. Conductive plush (56) electrically connect with conductive base surface (50). Other components of this embodiment are similar to those of embodiment 1.

Figure 27:
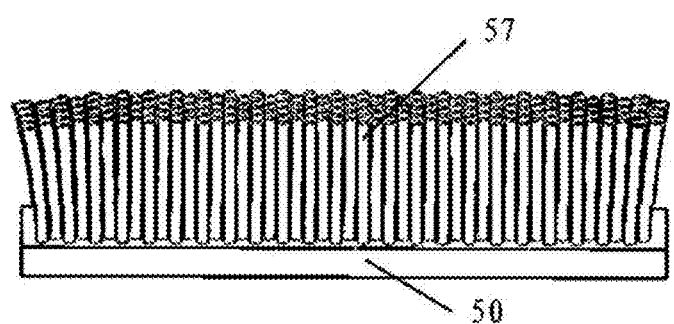
FIG. 27 shows the structure of a conductive brush.

Embodiment 10: Cube Detection Module (5) that Uses a Physical Contact Method: Conductive Brush FIG. 27 shows the structure of conductive brush (57) that includes a plurality of conductive brushes that are elastic and deform when pressed. Other components of this embodiment are similar to those of embodiment 1.

Figure 28:
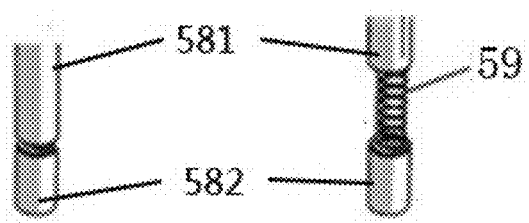
FIG. 28 shows the structure of a metal dome.

Embodiment 11: Cube Detection Module (5) that Uses a Physical Contact Method: Spring Contact Probe FIG. 28 shows the structure of spring contact probe that includes spring (59) and 2 metal cylinder housings (58), the combination of which contracts when pressed and is electrically connected. Other components of this embodiment are similar to those of embodiment 1.

Figure 29:
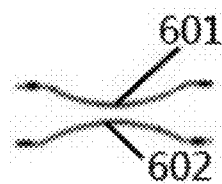
FIG. 29 shows a metal contact probe and its inside spring structure.

Embodiment 12: Cube Detection Module (5) that Uses a Physical Contact Method: Spring Contact Probe, or a Metal Dome FIG. 29 shows the structure of metal dome that includes 2 opposite metal domes (6), deforming when pressed, electrically connected. Other components of this embodiment are similar to those of embodiment 1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A smart puzzle cube having prompting and recording functions, comprising:
   at least four cubes (101),
   a central sphere body (4), and
   at least one conductive connector (8),
   wherein the cubes (101) and the central sphere body (4) are securely connected by the conductive connector (8) via a mechanical connection therebetween, the cubes (101) are structurally connected to each other and rotatable, and puzzle cube layers formed by the cubes (101) rotate in both directions without limit,
   wherein the conductive connector (8) includes a rotation detection module (10) that detects rotation directions and angles of the puzzle cube layers.

2. The smart puzzle cube of claim 1, further comprising:
   at least one cube detection module (5) between each cube (101) and the central sphere body (4), detecting the position and rotation state of each cube (101).

3. The smart puzzle cube of claim 2, wherein
   the cube detection module (5) applies a conductive material and a physical contact detection method, and includes a conductive metal or a conductive medium that is elastic and deforms when pressed; and
   when two neighboring cubes (101) or one cube (101) and the central sphere body (4) are aligned, the conductive metal or the conductive medium contacts each other and an electrical connection is established; when two neighboring cubes (101) or one cube (101) and the central sphere body (4) are not aligned, the conductive metal or the conductive medium does not contact each other and the electrical connection is not established; and when the electrical connection is established, the central sphere body (4) detects a voltage and a current of the electrical connection in each cube (101), and calculates the position and rotation state of each cube (101).

4. The smart puzzle cube of claim 3, wherein the cube detection module (5) includes a conductive sponge, a metal plated silicone ball, a metal dome swipe, a conductive plush pad, a conductive brush, a spring contact probe, or a metal dome.

5. The smart puzzle cube of claim 4, wherein the conductive sponge includes a sponge (52) that is elastic and deforms when pressed and an outer wrapping conductive cloth (51).

6. The smart puzzle cube of claim 4, wherein the metal plated silicone ball includes a ball (54) that is elastic and deforms when pressed and an outer conductive metal layer (53).

7. The smart puzzle cube of claim 2, wherein the cube detection module (5) applies a non-physical-contact wireless detection method and includes a photoelectric detection module (37); and the photoelectric detection module (37) is located on a surface of the central sphere body (4), emits a light (47) to a corresponding part to each cube (101), detects a color and signature of a reflected light, and calculates the position and rotation state of each cube (101).

8. The smart puzzle cube of claim 7, wherein the light (47) is an infrared light or laser.

9. The smart puzzle cube of claim 1, further comprising: cube housings (102), a central sphere body housing (2), a prompting module (14), a gyroscope module (27), a wireless receiving-emitting module (36), a power supply module (28), a switch (13), and a control module (26).

10. The smart puzzle cube of claim 1,
wherein the smart puzzle cube is a multi-faceted three-dimensional body and includes at least eight cubes (101) combined into an n-th order hexagonal cube of n×n×n, n is an integer equal to or greater than 2, the cubes (101) being divided into eight corner blocks (1), 12(n−2) side blocks (2) and 6(n−2) center blocks (3); the eight corner blocks (1) are each located at eight vertex angles of the hexagonal cube; the 12(n−2) side blocks (2) are each located at twelve sides of the hexagonal cube and between two corner blocks (1); the 6(n−2) center blocks (3) are each located at six faces of the hexagonal cube and surrounded by the corner blocks (1) and side blocks (2); and when n is an even number, the cubes (101) are further divided into hidden side blocks (2) and center blocks (3), and
wherein the central sphere body (4) is a structural center of the smart puzzle cube and has a sphere or a similar shape, and is combinable with some cubes (101).

11. The smart puzzle cube of claim 1, wherein the cube housings (102) are made of a translucent material or a partially hollow material, and a light from an electric bead (24) can pass through.

12. The smart puzzle cube of claim 1,
wherein the conductive connector (8) includes a conductive stud (800), a spring (8), and a nut (7);
wherein the rotation detection module (10) includes a conductive brush (12) and a non-full-ring resistor (97), the center block (3) rotating and driving the non-full-ring resistor (97), the conductive brush (12) being non-rotatable, forming a ring-shaped detection circuit;
wherein the conductive stud (800) includes a conductive stud housing (81), a plurality of metal bodies (83, 84, 85, 86, 87) surrounding an axis and segmented conductors (91, 92, 93, 94, 95), realizing an electrical connection of an uniaxial rotation of conductors; and
wherein the spring (6) is located inside of the central sphere body (4) or inside the center block (3).

13. The smart puzzle cube of claim 1, wherein the rotation detection module (10) includes a rotary potentiometer or an encoder.

14. The smart puzzle cube of claim 9, wherein the gyroscope module (27) includes a gyroscope (76) and an accelerometer (77), calculating overall flip data.

15. The smart puzzle cube of claim 9,
wherein the wireless receiving-emitting device (36) is connected to an external computer (34), a virtual program of the external computer (34) being synchronized with smart puzzle cube; the virtual program of the external computer (34) calculates a reduction formula and records the operation of the smart puzzle cube; and the external computer (34) is connected to internet, and
wherein the external computer (34) is a mobile phone or a mobile computer.

16. The smart puzzle cube of claim 9, wherein the prompting module (14) applies a prompting method via an electric bead (24), the an electric bead (24) is located inside of each cube (101) or on a surface of each cube (101) corresponding to the central sphere body (4) and is controlled by a program, and the electric bead (24) flashes based on a certain rule to provide prompts.

17. The smart puzzle cube of claim 9, wherein the prompting module (14) applies a voice mode or other sensory mode.

18. The smart puzzle cube of claim 9, wherein the power supply module (28) includes a rechargeable battery located inside the central sphere body (4), the switch (13) is located inside or on a surface of the center block (3), and the switch (13) is connected to the control module (26) that is located inside the central sphere body (4) via the conductive connector (8).

19. The smart puzzle cube of claim 1, further comprising: a wireless charging base (30),
wherein the wireless charging base (30) includes a power management module (31) and wireless transmitter module (29), a puzzle cube (100) is placed on the wireless charging base (30), the central sphere body (4) or the cube (101) includes a wireless charging receiver module (33).

20. The smart puzzle cube of claim 1, further comprising a timer module,
wherein the timer module starts when detecting a operation signal; and the timer stops when detecting the colors on all sides of the smart puzzle cube match.

* * * * *